// 
US009674119B2

(12) United States Patent
Yun et al.

(10) Patent No.: US 9,674,119 B2
(45) Date of Patent: Jun. 6, 2017

(54) METHOD AND APPARATUS FOR CONTROLLING AUDIO/VIDEO BRIDGING STREAM FOR IN-VEHICLE ETHERNET

(71) Applicant: HYUNDAI MOTOR COMPANY, Seoul (KR)

(72) Inventors: Jin Hwa Yun, Seoul (KR); Kang Woon Seo, Goyang-si (KR); Dong Ok Kim, Goyang-si (KR)

(73) Assignee: Hyundai Motor Company, Seoul (KR)

( * ) Notice: Subject to any disclaimer, the term of this patent is extended or adjusted under 35 U.S.C. 154(b) by 114 days.

(21) Appl. No.: 14/659,400

(22) Filed: Mar. 16, 2015

(65) Prior Publication Data

US 2016/0173330 A1 Jun. 16, 2016

(30) Foreign Application Priority Data

Dec. 10, 2014 (KR) ........................ 10-2014-0177392

(51) Int. Cl.
*H04L 12/28* (2006.01)
*H04L 12/931* (2013.01)
(Continued)

(52) U.S. Cl.
CPC ......... *H04L 49/354* (2013.01); *H04B 1/3822* (2013.01); *H04L 12/413* (2013.01)

(58) Field of Classification Search
CPC combination set(s) only.
See application file for complete search history.

(56) References Cited

U.S. PATENT DOCUMENTS 8,060,615 B2 * 11/2011 Finn ...................... H04L 12/462
709/204
2009/0158360 A1 6/2009 Diab et al.
(Continued)

FOREIGN PATENT DOCUMENTS

JP 2013-258700 A 12/2013
KR 10-2008-0043100 A 5/2008
(Continued)

OTHER PUBLICATIONS

Mann et al, ABV Software Interfaces, AVnu AllianceTM Best Practice, 74 pages, Dec. 2013.*
(Continued)

*Primary Examiner* — Frank Duong
(74) *Attorney, Agent, or Firm* — McDermott Will & Emery LLP (57) ABSTRACT

The present invention relates to a method and apparatus for controlling an audio/video bridging (AVB) stream in an in-vehicle Ethernet communication network. A method for controlling an audio/video bridging (AVB) stream in an in-vehicle Ethernet communication network may include configuring an AVB frame using audio/video (AV) data received from an upper application layer, acquiring a stream subtype identifier (ID) corresponding to the configured AVB frame, identifying a host having generated the AVB frame, identifying a domain including the identified host, identifying a stream class of the AVB frame, generating an AVB stream ID based on the acquired stream subtype ID, the identified host, the identified domain and the identified stream class, and transmitting the generated AVB stream ID in the AVB frame to a sub layer.

23 Claims, 6 Drawing Sheets

(51) Int. Cl.
  *H04B 1/3822*  (2015.01)
  *H04L 12/413*  (2006.01)

(56) References Cited

U.S. PATENT DOCUMENTS

2012/0314597 A1\* 12/2012 Singh ................. H04L 43/0882
                                              370/252
2013/0007288 A1\*  1/2013 Olsen ................. H04L 65/1069
                                              709/227
2013/0166674 A1\*  6/2013 Olsen ...................... H04L 69/08
                                              709/217
2015/0026303 A1\*  1/2015 Olsen ................... H04L 47/724
                                              709/219

FOREIGN PATENT DOCUMENTS

KR         10-1181100 B1    9/2012
KR      10-2013-0002948 A   1/2013
KR         2014-0072012 A   6/2014

OTHER PUBLICATIONS

H. Lim et al., "Performance Analysis of the IEEE 802.1 Ethernet Audio/Video Bridging Standard," Simutools 2012 (Mar. 19-23, 2012).
Korean Office Action issued in Application No. 10-2014-0177392 dated Feb. 22, 2016.

\* cited by examiner

| DOMAIN | VLAN TYPE | VLAN ID |
|---|---|---|
| BODY | VLAN 1(CAN) | 0x00 |
| | VLAN 2(CAN) | 0x01 |
| | VLAN 3(LIN) | 0x02 |
| | VLAN 3(FlexRay) | 0x03 |
| HEAD UNIT | VLAN 1(CAN) | 0x10 |
| DAS | VLAN 1(CAN) | 0x20 |
| SURROUND VIEW | VLAN 1(LIN) | 0x30 |
| | VLAN 2(CAN) | 0x31 |
| CHASSIS | VLAN 1(FlexRay) | 0x40 |
| ⋮ | ⋮ | ⋮ |

| SERIAL NUMBER | VLAN ID | HOST ID | STREAM CLASS | SUBTYPE ID |
|---|---|---|---|---|
| 0x00000000 | 0x30 | 0x7D | 0x01 | 0x00 |
| 0x00000001 | 0x40 | 0x4A | 0x00 | 0x6F |
| . | . | . | . | |
| . | . | . | . | |

FIG. 11

- Application Layer
- Streaming Media Application Protocol Interface
- IEEE 1722 Layer 2 AVB Transport Protocol
- IEEE 802.1Qav Shaping
- IEEE 802 Ethernet Driver

METHOD AND APPARATUS FOR CONTROLLING AUDIO/VIDEO BRIDGING STREAM FOR IN-VEHICLE ETHERNET

CLAIM OF PRIORITY

This application claims the benefit of priority to Korean Patent Application No. 10-2014-0177392, filed on Dec. 10, 2014, which is hereby incorporated by reference as if fully set forth herein.

TECHNICAL FIELD

The present invention relates to in-vehicle Ethernet communication and, more particularly, to a method for configuring an audio/video bridging (AVB) stream identifier (ID) to uniquely identify a stream in an AVB network, and an apparatus therefor.

BACKGROUND

Current rapid development of information technology (IT) greatly influences the automotive industry, and a variety of IT technologies are grafted onto vehicles.

As the number of electronic control units (ECUs) embedded in a vehicle increases and a variety of external devices (e.g., including a smartphone, a wearable device and a Bluetooth headset) cooperate with the vehicle, an in-vehicle communication network is overloaded. In addition, costs for wiring harnesses used to connect communication lines between ECUs are rapidly increasing.

Accordingly, the automotive industry gives attention to Ethernet as the most promising candidate of a next-generation in-vehicle networking infrastructure as a successor to a controller area network (CAN) and FlexRay.

Ethernet defined as an IEEE standard and used a lot by customers and industries is characterized in that reuse factors for components, software and tools are high and that bandwidths necessary for driver assistance systems (DASs), infotainment systems, etc. are providable.

However, to be successfully applied to in-vehicle communication, Ethernet should be optimized in terms of scalability, cost, power and robustness of a variety of solutions applied to a vehicle.

Since new and complex applications are embedded in a vehicle to strengthen safety and to provide entertainment, demands for an optimized communication scheme and a sufficient bandwidth are increasing.

Particularly, although end users expect to experience entertainment in a vehicle to the level of home entertainment, a conventional in-vehicle communication network such as a local interconnect network (LIN), a CAN or FlexRay is not sufficient to provide various types of DASs and entertainment solutions in terms of bandwidth and scalability.

SUMMARY OF THE INVENTION

Accordingly, the present invention is directed to a method and apparatus for controlling an audio/video bridging (AVB) stream in an in-vehicle Ethernet communication network which substantially obviate one or more problems due to limitations and disadvantages of the related art.

An object of the present invention is to provide a method for configuring an audio/video bridging (AVB) stream identifier (ID) for in-vehicle Ethernet communication Another object of the present invention is to provide a frame structure of an audio/video (AV) transport protocol data unit appropriate for an in-vehicle network environment.

A further object of the present invention is to provide a method for configuring an AVB stream ID, capable of defining an AVB stream ID configured as a combination of attributes of an AV stream to intuitively check attributes of the stream even when a separate database for the stream is not present.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an audio/video bridging (AVB) stream in an in-vehicle Ethernet communication network includes configuring an AVB frame using audio/video (AV) data received from an upper application layer, acquiring a stream subtype identifier (ID) corresponding to the configured AVB frame, identifying a host having generated the AVB frame, identifying a domain including the identified host, identifying a stream class of the AVB frame, generating an AVB stream ID based on the acquired stream subtype ID, the identified host, the identified domain and the identified stream class, and transmitting the generated AVB stream ID in the AVB frame to a sub layer.

The stream subtype ID may be acquired by reading a subtype field value included in a subtype data region of the configured AVB frame.

The AVB stream ID may be generated with reference to an AVB stream attribute table previously input based on attributes per AVB stream.

The AVB stream attribute table may be configured to include at least one record, and the record may be configured to include at least one of a serial number indicating an order in which records of a corresponding AVB stream are recorded in the AVB stream attribute table, a virtual local area network (VLAN) ID for identifying a VLAN to which the corresponding AVB stream belongs, a host ID for identifying a host of the corresponding AVB stream, a stream class for identifying priority assigned to the corresponding AVB stream, and a stream subtype ID for identifying a transport protocol applied to the corresponding AVB stream.

The serial number may be recorded in the AVB stream attribute table in ascending order of the records, and may have a length of 4 bytes.

The AVB stream ID may be a unique ID obtained by combining the VLAN ID, the host ID, the stream class, the stream subtype ID and the serial number in described order.

The AVB stream ID may be an 8-byte unique ID obtained by combining the VLAN ID having a size of 1 byte, the host ID having a size of 1 byte, the stream class having a size of 1 byte, the stream subtype ID having a size of 1 byte, and the serial number having a size of 4 bytes.

The VLAN ID may be defined to identify a domain included in the in-vehicle Ethernet communication network.

The VLAN ID may be defined to identify a domain included in the in-vehicle Ethernet communication network and to identify at least one VLAN included in the identified domain.

The domain may include at least one of a body domain, a head unit domain, a powertrain domain, a multimedia domain and a chassis domain.

The sub layer may be a media access control (MAC) layer.

In another aspect of the present invention, a computer-readable recording medium has recorded thereon a computer program for executing the above method.

In another aspect of the present invention, an apparatus for controlling an audio/video bridging (AVB) stream in an in-vehicle Ethernet communication network includes means for configuring an AVB frame using audio/video (AV) data received from an upper application layer, means for acquiring a stream subtype identifier (ID) corresponding to the configured AVB frame, means for identifying a host having generated the AVB frame, means for identifying a domain including the identified host, means for identifying a stream class of the AVB frame, means for generating an AVB stream ID based on the acquired stream subtype ID, the identified host, the identified domain and the identified stream class, and means for transmitting the generated AVB stream ID in the AVB frame to a sub layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates an audio/video bridge transport protocol (AVBTP) frame format defined in IEEE 1722a;

FIG. 2 is a view for describing the configuration of an audio/video bridging (AVB) stream identifier (ID) defined in IEEE 1722a;

DETAILED DESCRIPTION OF THE INVENTION

Reference will now be made in detail to the preferred embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present invention are described as being integrated into a single one or as being operated as a single one, the present invention is not necessarily limited to such embodiments. According to embodiments, all of the elements may be selectively integrated into one or more and be operated as one or more within the object and scope of the present invention. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present invention pertains. The computer program may be stored in computer readable media such that the computer program is read and executed by a computer to implement embodiments of the present invention. Computer program storage media may include magnetic recording media, optical recording media, and carrier wave media.

The terms "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not to be interpreted as having ideal or excessively formal meanings.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "combined with", or "coupled to" another element, one element may be "connected to", "combined with", or "coupled to" another element via a further element although one element may be directly connected or coupled to another element.

A brief description is now given of terms used for IEEE 1722 and an audio/video bridging (AVB) network.

IEEE 1722 defines a structure capable of transmitting a media frame format, time information for synchronization, control data information, etc. using an audio/video bridge transport protocol (AVBTP) for data of an audio/video (AV) stream which should be transmitted in real time through Ethernet. The AVBTP is divided into a structure for transmitting real-time AV user data and a structure for transmitting a control signal, and a frame structure for transmitting AV user data includes a field capable of transmitting synchronized time information.

An AVB domain (or AVB cloud) refers to a set of interconnected network nodes and communication links for interconnecting the same.

An AVB stream refers to a packet flow in a specific AVB domain and may include at least one physical/logical channel used for data transmission. The AVB stream has a unique ID in an AVB network and can be assigned using a stream reservation protocol defined in IEEE 802.1Qat.

A sender (or talker) refers to an entity for transmitting a stream in an AVB domain, and a receiver (or listener) refers to an entity for receiving the stream in the AVB domain.

An AVBTP frame may be transmitted from the sender to the receiver directly or via a bridge.

An AVB stream is time-sensitive data and should be received simultaneously by a plurality of receivers in multicast communication. Accordingly, presentation timestamp information indicating a media playback time based on a network transport time is included in a stream packet. Accordingly, the receiver may determine a media playback time based on the presentation timestamp information included in the received packet. Timing and synchronization acquisition methods of time sensitive applications in an AVB network are defined in IEEE 802.1AS.

Figure 1:
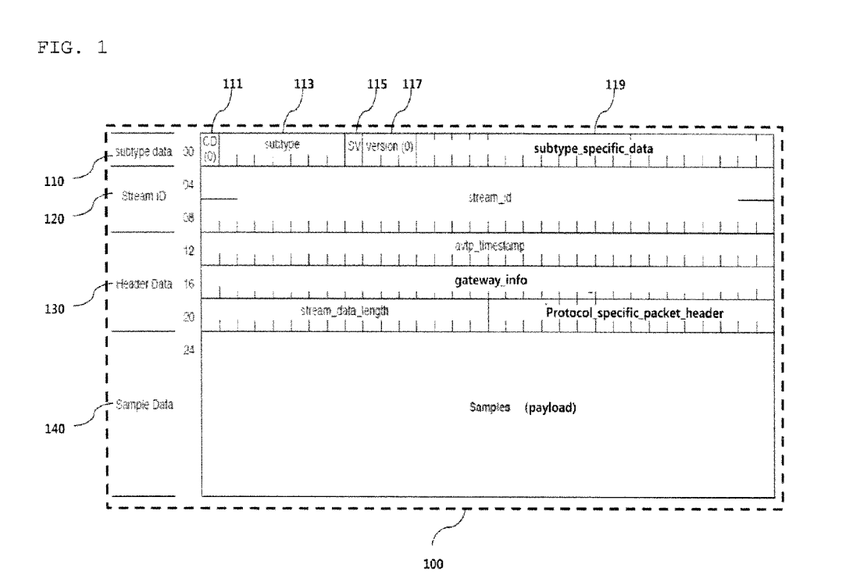

FIG. 1 illustrates an AVBTP frame format 100 defined in IEEE 1722a.

IEEE 1722a is an amendment of IEEE 1722, and includes additional considerations and field configuration update information for formats excluded from IEEE 1722.

Although a method and apparatus for controlling an AVB stream for in-vehicle Ethernet according to the present invention will be described below based on definitions of IEEE 1722a, it should be noted that IEEE 1722a merely corresponds to an embodiment and the idea of the present invention is equally applicable to the final version of IEEE 1722 and other in-vehicle communication standards.

An AVBTP frame (or packet) may be encapsulated in an Ethernet packet. The Ethernet packet may be configured to mainly include an IEEE 802.3 media access control (MAC) header region, a virtual local area network (VLAN) tag region, an AVBTP type region, an AVBTP packet region, a cyclic redundancy check (CRC) region, etc.

Referring to FIG. 1, the AVBTP frame format 100 may be configured to mainly include a subtype data region 110, a stream ID region 120, a header data region 130 and a sample data region 140.

Here, it should be noted that the sizes of the header data region 130 and the sample data region 140 are dynamically variable depending on field values included in the subtype data region 110.

The subtype data region 110 includes a control/data (CD) field 111, a subtype field 113, a stream_id valid (SV) field 115, a version field 117 and a subtype specific data field 119.

The CD field 111 is an indicator for identifying whether a corresponding frame is a control frame or a user data frame, and has a length of 1 bit. For example, the CD field 111 may indicate a control frame using a value of 0, and indicate a user data frame using a value of 1.

The subtype field 113 includes information for identifying the type of a streaming protocol, and has a length of 8 bits. Here, the subtype field 113 may be defined as a subtype (0x00) corresponding to various streaming protocols defined in IEC 61883, a subtype (0x6F) corresponding to vendor specific stream protocols, and a proprietary/experimental subtype (0x7F). For example, the streaming protocols defined in IEC 61883 may include the SD-DVCR protocol defined in IEC 61883-2, the MPEG2-TS compressed video protocol defined in IEC 61883-4, the uncompressed audio protocol defined in IEC 61883-6, the satellite TV MPEG protocol defined in IEC 61883-7, and the BT.601/656 video protocol defined in IEC 61883-8dp, etc.

Here, the vendor specific stream protocols refer to streaming protocols predefined by vehicle manufacturers.

The SV field 115 is an indicator for identifying whether a stream ID, which is included in the stream ID region 120 to be described below, is a valid value, and has a length of 1 bit. For example, the SV field 115 may indicate that the value of a stream ID field is not valid using a value of 0, and indicate that the value of the stream ID field is valid using a value of 1.

The version field 117 is used to identify revision of IEEE 1722, and has a length of 3 bits. In general, when a standard document is updated, frame specifications and definitions of fields included in each frame may be changed accordingly. As such, version information of the standard applied to the corresponding frame is preferably included at a side of the frame to maintain compatibility or the like with a previous version.

The subtype specific data field 119 may be configured to include different fields depending on whether the corresponding frame is a control frame or a data frame. For example, if the corresponding packet frame is a control frame, the subtype specific data field 119 may include a protocol specific data field, a status flags field, a control frame length field, etc. Otherwise, if the corresponding packet frame is a data frame, the subtype specific data field 119 may include an mr field for identifying whether a source of a media clock is changed or whether to restart a media clock (or engine), a gv field for identifying whether valid gateway information is present, a tv field for identifying whether a valid AVBTP timestamp value for synchronization is present in a network, a sequence number field corresponding to the data frame on a stream transmitted from a sender, etc.

Here, an AVBTP timestamp field, a gateway field, etc. may be included in the header data region 130.

The stream ID region 120 is a region in which a stream ID for uniquely identifying a corresponding stream in an AVB network is recorded, and has a length of 64 bits.

The header data region 130 may have a variable length depending on field values included in the subtype data region 110. For example, if the AVBTP frame is a data frame, the header data region 130 may include the AVBTP timestamp field, the gateway information field, a stream data length field, a protocol specific packet header field, etc.

The sample data region 140 has a variable length and may include actual user data (payload) and padding.

Figure 2:
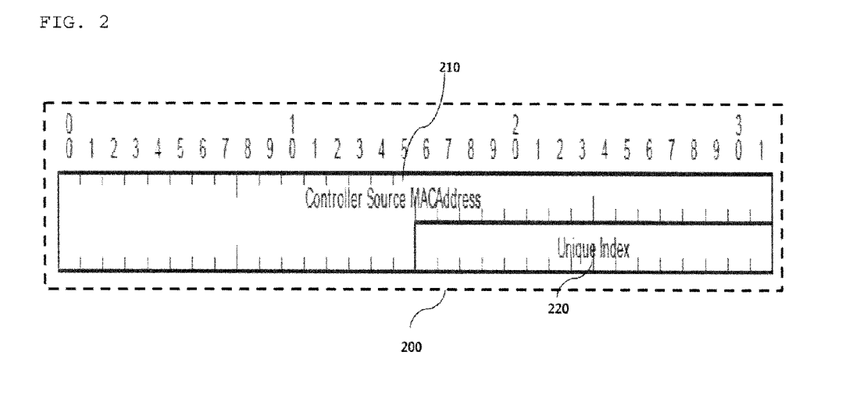

FIG. 2 is a view for describing the configuration of a stream ID 200 defined in IEEE 1722a.

Referring to FIG. 2, the stream ID 200 currently discussed in IEEE 1722a includes a controller source MAC address field 210 having a length of 48 bits and a unique index field 220 having a length of 16 bits.

In general, an in-vehicle network environment has characteristics of a closed and fixed network, and is capable of predicting a data flow, i.e., a stream, therein.

Particularly, in the case of an in-vehicle network, since a variety of controllers need to be rapidly booted to guarantee safety, fast processing of a packet in a network is essential.

However, in a conventional case, since a region per stream is dynamically assigned, the performance of an in-vehicle network may not be optimized.

In addition, if an electronic control unit (ECU) in an in-vehicle network is replaced due to breakdown or the like, a MAC address of a new ECU should be reflected in a routing table. Particularly, if the ECU is replaced at an A/S center not managed by a corresponding vehicle manufacturer, the routing table may not be easily managed.

Accordingly, the present invention proposes a method for configuring an AVB stream ID capable of achieving rapid routing and intuitive identification of an AVB stream in an in-vehicle network by assigning the stream ID predefined based on attributes of the AVB stream in the in-vehicle network and maintaining the same in the form of a table.

In addition, the present invention proposes a method for configuring an AVB stream ID which does not need to separately update a routing table when an ECU is replaced.

Figure 3:
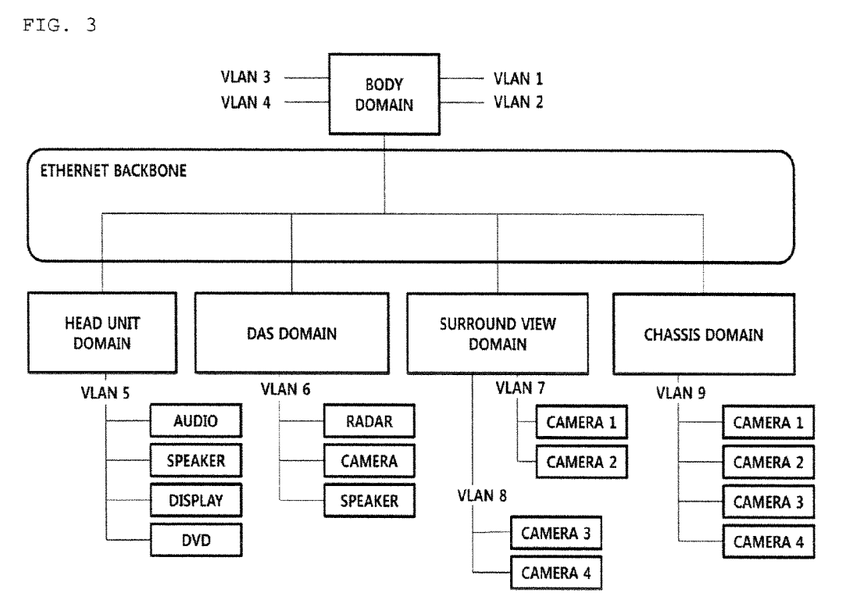
FIG. 3 is a view for describing the architecture of an in-vehicle network according to an embodiment of the present invention.

FIG. 3 is a view for describing the architecture of an in-vehicle network according to an embodiment of the present invention.

Referring to FIG. 3, the in-vehicle network may include a plurality of domains grouped based on characteristics and functions of ECUs. For example, the domains included in the in-vehicle network may be configured to include a body domain, a head unit domain, a driver assistance system (DAS) domain, a surround view domain, a chassis domain, etc. Here, these domains may communicate with each other through an Ethernet backbone network, and each domain may function as a switching hub for ECUs included in the domain. In addition, each domain may function as a router for transporting packets between different networks.

Furthermore, at least one VLAN may be configured in each domain based on characteristics and functions of ECUs included in the domain. For example, referring to FIG. 3, the body domain may include VLANs 1 to 4.

The VLAN forms a communication group based on characteristics and functions of ECUs included in a domain irrespective of physical connections between the ECUs. However, the VLAN may also be configured based on the physical connections. For example, ECUs which are sensitive to delay may be assigned to the same VLAN. Otherwise, ECUs which require large bandwidths may be assigned to the same VLAN. That is, the VLAN may be assigned based on quality of service parameters required per ECU included in a specific domain. Here, the quality of service parameters may include real time property, bandwidth, transmission delay, error rate, etc.

The names and configurations of the domains in the in-vehicle network of FIG. 3 merely correspond to an embodiment, and different manufacturers and models may have different configurations. For example, the domains according to an embodiment of the present invention may be configured to include a body domain, a head unit domain, a chassis domain, a powertrain domain, a multimedia domain, etc.

Furthermore, although the domains are connected to each other through the Ethernet backbone network in FIG. 3, it should be noted that the Ethernet backbone network merely corresponds to an embodiment and the domains may be connected to and communicate with each other through a vehicle gateway according to another embodiment of the present invention. In this case, the vehicle gateway may be recognized as one node in an in-vehicle communication system.

In addition, although nodes are identified and indicated as domains in FIG. 3, the domains merely correspond to an embodiment and VLANs may be used to logically group the nodes irrespective of the domains.

Figure 4:
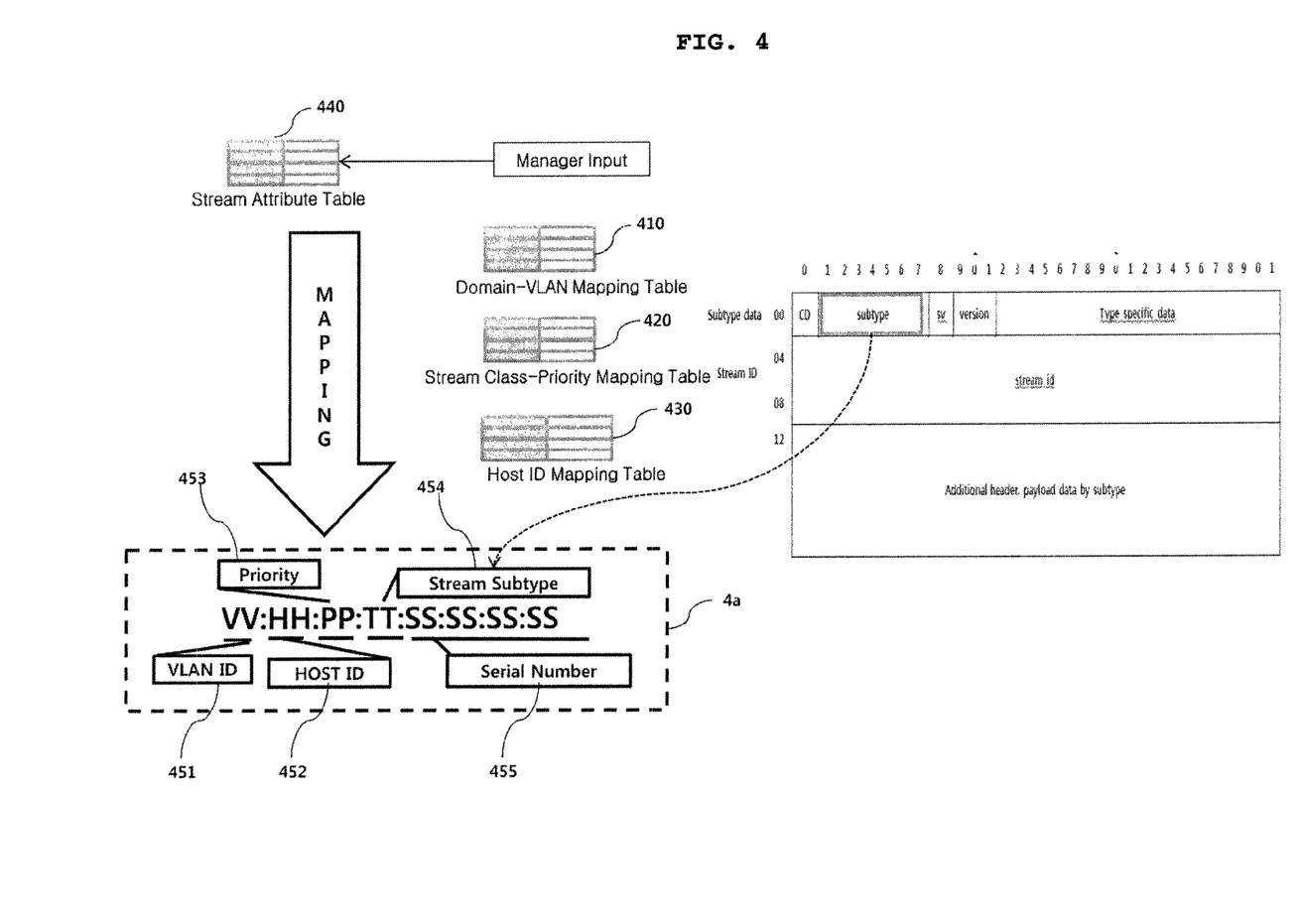
FIG. 4 is a view for describing a method for configuring an AVB stream ID according to an embodiment of the present invention.

FIG. 4 is a view for describing a method for configuring an AVB stream ID according to an embodiment of the present invention.

Referring to FIG. 4, a network manager may predefine and configure a domain-VLAN mapping table 410, a stream class-priority mapping table 420 and a host ID mapping table 430.

After that, the network manager inputs attribute information per AVB stream based on a use thereof to a stream attribute table 440 with reference to the three configured tables 410 to 430.

In this case, the attribute information per AVB stream input by the network manager may include a VLAN ID, a host ID, a stream class, a stream subtype, etc.

Furthermore, the network manager may input a serial number having a length of 4 bytes to the stream attribute table 440 based on the order in which the attribute information per AVB stream is input. For example, a serial number for the firstly input record may be 0x000000, a serial number for the secondly input record may be 0x000001, and a serial number for the thirdly input record may be 0x000002.

Referring to reference numeral 4a of FIG. 4, according to an embodiment the present invention, an AVB stream ID having a length of 64 bits may be configured to include a VLAN ID 451 having a length of 1 byte, a host ID 452 having a length of 1 byte, a priority 453 having a length of 1 byte, a stream subtype 454 having a length of 1 byte, and a serial number 455 having a length of 4 bytes.

It should be noted that the order of configuring the AVB stream ID may be partially changed. For example, the AVB stream ID may be configured in such a manner that the serial number 455 is located at most significant bits (MSBs) of the AVB stream ID.

Particularly, the stream subtype 454 may be copied from the value of the subtype field 113 included in the subtype data region 110 of a corresponding AVB frame.

Figure 5:
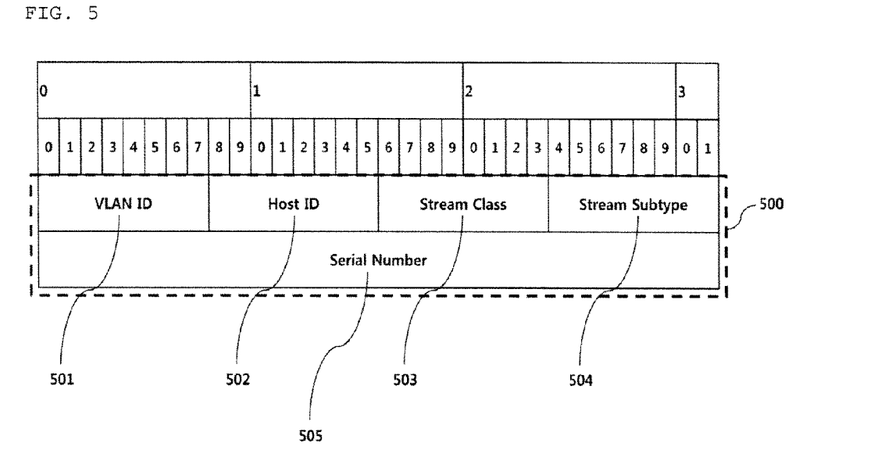
FIG. 5 illustrates a data structure of an AVB stream ID according to an embodiment of the present invention.

FIG. 5 illustrates the data structure of an AVB stream ID 500 according to an embodiment of the present invention.

Referring to FIG. 5, the stream ID region 120 of the AVBTP frame 100 may be configured to include a VLAN ID field 501 having a length of 1 byte, a host ID field 502 having a length of 1 byte, a stream class field 503 having a length of 1 byte, a stream subtype field 504 having a length of 1 byte, and a serial number field 505 having a length of 4 bytes.

Figure 6:
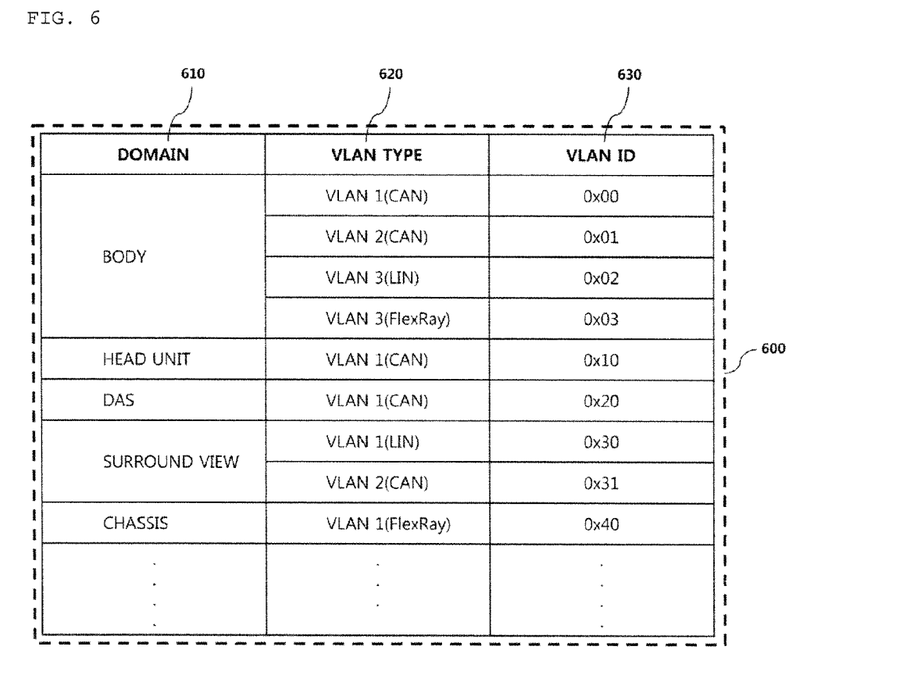
FIG. 6 illustrates an example of a domain-VLAN mapping table according to an embodiment of the present invention.

FIG. 6 illustrates an example of a domain-VLAN mapping table 600 according to an embodiment of the present invention.

As illustrated in FIG. 6, the domain-VLAN mapping table 600 may include a domain field 610, a VLAN type field 620 and a VLAN ID field 630.

For example, a value assigned to the VLAN ID field 630 may be configured to identify a domain using 4 most significant bits (MSBs) and to identify a VLAN type in the domain using 4 least significant bits (LSBs).

Accordingly, the VLAN ID according to the present invention may be defined not only to identify a domain included in an in-vehicle Ethernet communication network but also to identify at least one VLAN included in the domain.

Figure 7:
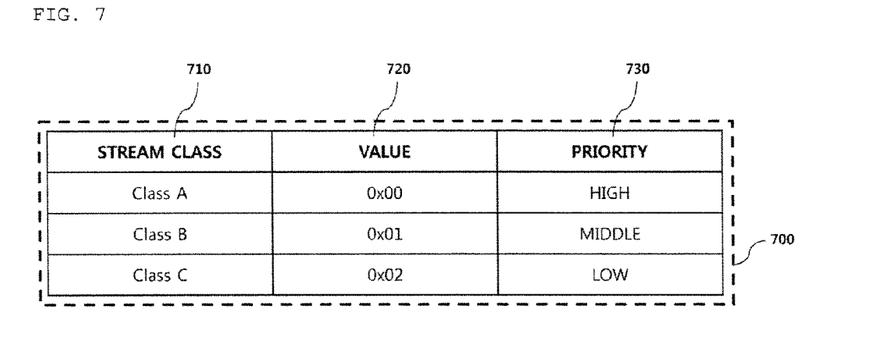
FIG. 7 illustrates an example of a stream class-priority mapping table according to an embodiment of the present invention.

FIG. 7 illustrates an example of a stream class-priority mapping table 700 according to an embodiment of the present invention.

As illustrated in FIG. 7, the stream class-priority mapping table 700 may be configured to include a stream class field 710, a value field 720 and a priority field 730.

Here, the stream class field 710 may be defined in such a manner that a higher priority is given to a class in alphabetical order, e.g., in the order of A, B, C, . . . . On the other hand, the value field 720 may be defined in such a manner that a higher priority is given to a smaller value.

Figure 8:
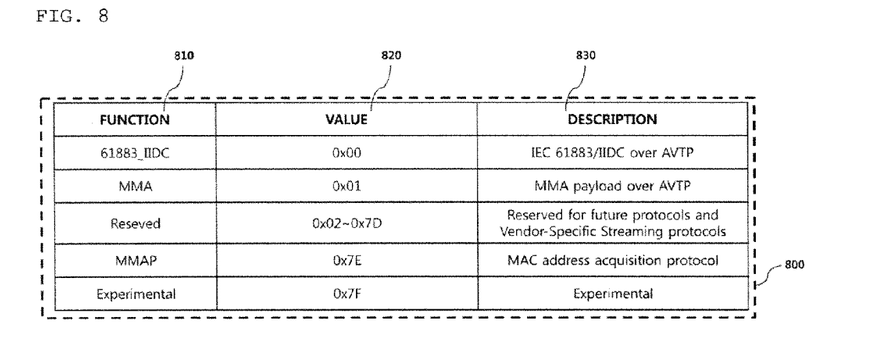
FIG. 8 illustrates a subtype mapping table for an AVB stream according to an embodiment of the present invention.

FIG. 8 illustrates a subtype mapping table 800 for an AVB stream according to an embodiment of the present invention.

Referring to FIG. 8, the subtype mapping table 800 may be configured to include a function field 810, a value field 820 and a description field 830.

A unique subtype ID may be defined based on a transport protocol applied to the AVB stream.

For example, a subtype ID corresponding to various streaming protocols defined in IEC 61883 may be defined as 0x00. In addition, a subtype ID corresponding to a transport protocol used for in-vehicle network analysis and experimentation may be defined as 0x7F.

Particularly, reserved values for future definition may be defined and used by a vehicle manufacturer. For example, the vehicle manufacturer may define and use a subtype ID corresponding to the IEEE 1722a-D8 transport protocol, as 0x6F.

Figure 9:
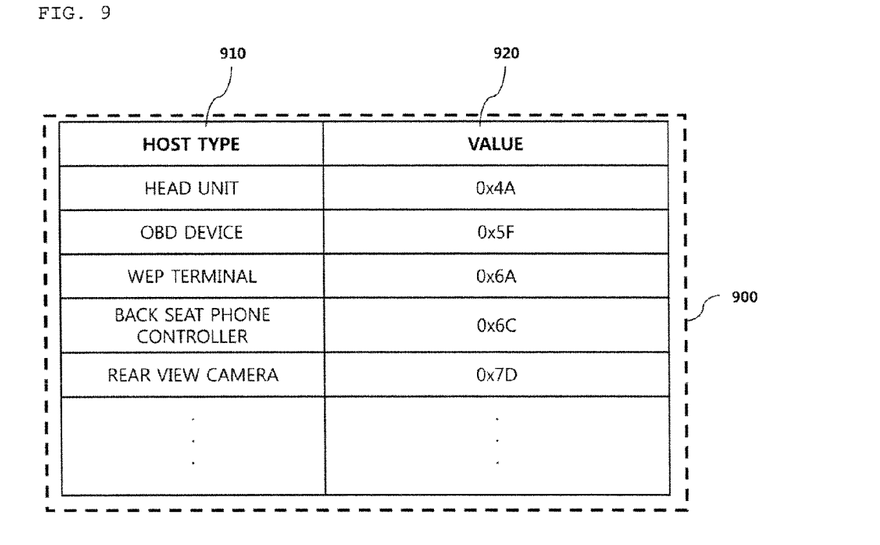
FIG. 9 illustrates a host ID mapping table according to an embodiment of the present invention.

FIG. 9 illustrates a host ID mapping table 900 according to an embodiment of the present invention.

Referring to FIG. 9, the host ID mapping table 900 may be configured to include a host type field 910 and a value field 920.

For example, a host ID corresponding to a head unit may be defined as 0x4A, and a host ID corresponding to a rear view camera may be defined as 0x7D.

Figure 10:
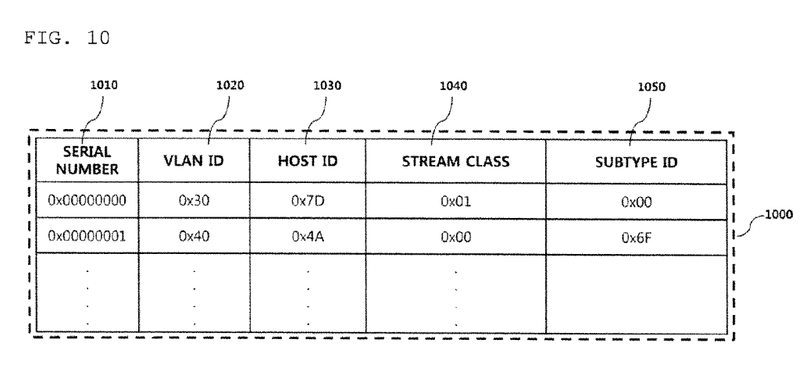
FIG. 10 illustrates an AVB stream attribute table according to an embodiment of the present invention.

FIG. 10 illustrates an AVB stream attribute table 1000 according to an embodiment of the present invention.

Referring to FIG. 10, the AVB stream attribute table 1000 may be configured to include a serial number field 1010, a VLAN ID field 1020, a host ID field 1030, a stream class field 1040 and a subtype ID field 1050.

For example, it is assumed that an AVB stream is an IEEE 1722a-D8 based vendor-specific stream having a priority of class A in a chassis domain, and a host for transmitting the AVB stream is a head unit. In this case, it is also assumed that attribute information of the AVB stream is secondly input to the AVB stream attribute table 1000.

An AVB stream ID according to the above example may be 0x404A006F00000001 obtained by combining a serial number (0x00000001), a VLAN ID assigned to the chassis domain (0x40), a host ID corresponding to the head unit (0x4A), a stream class corresponding to class A (0x00), and a subtype ID assigned to the IEEE 1722a-D8 based vendor-specific stream (0x6F).

Figure 11:
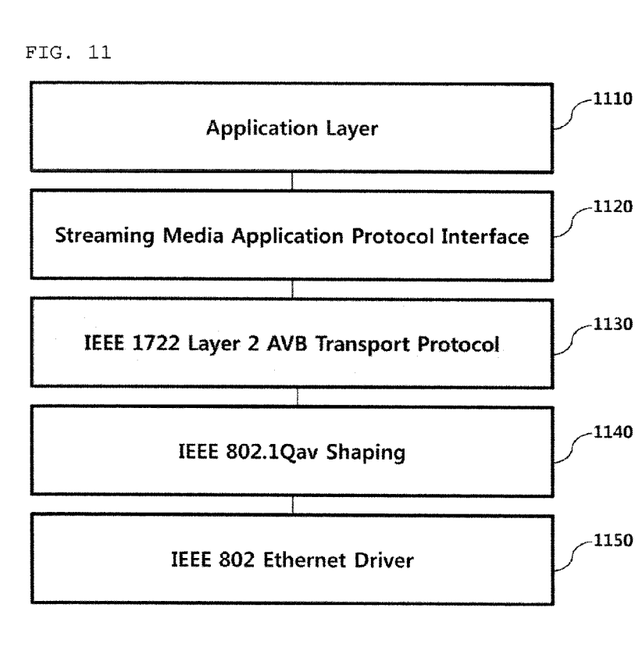
FIG. 11 is a view for describing a protocol layer structure according to an embodiment of the present invention.

FIG. 11 is a view for describing a protocol layer structure according to an embodiment of the present invention.

Referring to FIG. 11, an AV stream generated by an application layer 1110 is transmitted through a streaming media application protocol interface 1120 to an IEEE 1722 AVB transport protocol layer 1130. Here, the IEEE 1722 AVB transport protocol layer 1130 may be located on OSI 7 layer 2, and may transmit a processed AVB frame to a sub layer, e.g., a MAC layer. The IEEE 1722 AVB transport protocol layer 1130 configures and transmits an AVB frame to an IEEE 802.1Qav shaping layer 1140.

In this case, the IEEE 1722 AVB transport protocol layer 1130 may generate an AVB stream ID and configure an AVB frame into which the generated AVB stream ID is inserted, with reference to the AVB stream attribute table 1000 input by a network manager.

Subsequently, the IEEE 802.1Qav shaping layer 1140 adds necessary header information, e.g., VLAN tag information, to the received AVB frame, and transmits the AVB frame to an IEEE 802 Ethernet driver layer 1150. Here, the VLAN tag information may include a transport protocol ID, a VLAN ID, etc.

The IEEE 802 Ethernet driver layer 1150 adds source and destination MAC addresses and transmits the AVB frame to an Ethernet backbone network.

As is apparent from the above description, the method and apparatus according to the present invention have the following effects.

First, the present invention may provide a method for configuring an audio/video bridging (AVB) stream identifier (ID) for in-vehicle Ethernet communication.

Second, the present invention may provide a frame structure of an audio/video (AV) transport protocol data unit appropriate for an in-vehicle network environment.

Third, the present invention may define an AVB stream ID configured as a combination of attributes of an AV stream to intuitively check attributes of the stream even when a separate database for the stream is not present.

Fourth, the present invention may effectively provide in-vehicle Ethernet communication irrespective of whether a media access control (MAC) address is changed when an electronic control unit (ECU) is replaced.

Fifth, the present invention may inherit a conventional in-vehicle network management system to minimize additional management costs.

It will be appreciated by persons skilled in the art that the effects that could be achieved through the present invention are not limited to what has been particularly described hereinabove and other advantages of the present invention will be more clearly understood from the above detailed description.

Those skilled in the art will appreciate that the present invention may be carried out in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for controlling an audio/video bridging (AVB) stream in an Electrical Control Unit (ECU) connected to an in-vehicle Ethernet communication network, the method comprising:

configuring an AVB frame using audio/video (AV) data generated by an upper application layer, wherein an AVB transport protocol layer receives the AV data through a streaming media application protocol interface;

acquiring, by the AVB transport protocol layer, a stream subtype identifier (ID) for identifying a transport protocol applied to the configured AVB frame;

identifying, by the AVB transport protocol layer, a host having generated the AVB frame;

identifying, by the AVB transport protocol layer, a domain comprising the identified host;

identifying, by the AVB transport protocol layer, a stream class of the AVB frame;

generating, by the AVB transport protocol layer, an AVB stream ID based on the acquired stream subtype ID, the identified host, the identified domain and the identified stream class; and transmitting, by the AVB transport protocol layer, the AVB frame including the generated AVB stream ID to a sub layer.

2. The method according to claim 1, wherein the stream subtype ID is acquired by reading a subtype field value comprised in a subtype data region of the configured AVB frame.

3. The method according to claim 1, wherein the AVB stream ID is generated with reference to an AVB stream attribute table previously input based on attributes per AVB stream.

4. The method according to claim 3, wherein the AVB stream attribute table comprises at least one record, and
wherein the record comprises at least one of:
a serial number indicating an order in which records of a corresponding AVB stream are recorded in the AVB stream attribute table;
a virtual local area network (VLAN) ID for identifying a VLAN to which the corresponding AVB stream belongs;
a host ID for identifying a host of the corresponding AVB stream;
a stream class for identifying priority assigned to the corresponding AVB stream; and
the stream subtype.

5. The method according to claim 4, wherein the serial number is recorded in the AVB stream attribute table in ascending order of the records, and has a length of 4 bytes.

6. The method according to claim 4, wherein the AVB stream ID is a unique ID obtained by combining the VLAN ID, the host ID, the stream class, the stream subtype ID and the serial number in described order.

7. The method according to claim 4, wherein the AVB stream ID is an 8-byte unique ID obtained by combining:
the VLAN ID having a size of 1 byte;
the host ID having a size of 1 byte;
the stream class having a size of 1 byte;
the stream subtype ID having a size of 1 byte; and
the serial number having a size of 4 bytes.

8. The method according to claim 4, wherein the VLAN ID is defined to identify a domain comprised in the in-vehicle Ethernet communication network.

9. The method according to claim 4, wherein the VLAN ID is defined to identify a domain comprised in the in-vehicle Ethernet communication network and to identify at least one VLAN comprised in the identified domain.

10. The method according to claim 1, wherein the domain comprises at least one of a body domain, a head unit domain, a powertrain domain, a multimedia domain and a chassis domain.

11. The method according to claim 1, wherein the sub layer is a media access control (MAC) layer.

12. A non-transitory computer readable storage medium containing a computer program for controlling an audio/video bridging (AVB) stream in an Electrical Control Unit (ECU) connected to an in-vehicle Ethernet communication network, the computer program configured to cause the following to occur when read and processed by a computer system:
configuring an AVB frame using audio/video (AV) data generated by an upper application layer, wherein an AVB transport protocol layer receives the AV data through a streaming media application protocol interface;
acquiring, by the AVB transport protocol layer, a stream subtype identifier (ID) for identifying a transport protocol applied to the configured AVB frame;
identifying, by the AVB transport protocol layer, a host having generated the AVB frame;
identifying, by the AVB transport protocol layer, a domain comprising the identified host;
identifying, by the AVB transport protocol layer, a stream class of the AVB frame;
generating, by the AVB transport protocol layer, an AVB stream ID based on the acquired stream subtype ID, the identified host, the identified domain and the identified stream class; and
transmitting, by the AVB transport protocol layer, the AVB frame including the generated AVB stream ID to a sub layer.

13. An apparatus for controlling an audio/video bridging (AVB) stream in an Electrical Control Unit (ECU) connected to an in-vehicle Ethernet communication network, the apparatus comprising:
an application layer configured to generate audio/video (AV) data;
an AVB transport protocol layer configured to receive the AV data through a streaming media application protocol interface and generate an AVB frame using the received AV data; and
an Ethernet driver configured to transmit the generated AVB frame to an Ethernet backbone network,
wherein the AVB transport protocol layer is configured to:
acquire a stream subtype identifier (ID) for identifying a transport protocol applied to the configured AVB frame,
identify a host having generated the AVB frame,
identify a domain comprising the identified host,
identify a stream class of the AVB frame,
generate an AVB stream ID based on the acquired stream subtype ID, the identified host, the identified domain and the identified stream class, and
transmit the AVB frame including the generated AVB stream ID to a sub layer.

14. The apparatus according to claim 13, wherein the stream subtype ID is acquired by reading a subtype field value comprised in a subtype data region of the AVB frame.

15. The apparatus according to claim 13, wherein the AVB stream ID is generated with reference to an AVB stream attribute table previously input based on attributes per AVB stream.

16. The apparatus according to claim 15, wherein the AVB stream attribute table comprises at least one record, and
wherein the record comprises at least one of:
a serial number indicating an order in which records of a corresponding AVB stream are recorded in the AVB stream attribute table;
a virtual local area network (VLAN) ID for identifying a VLAN to which the corresponding AVB stream belongs;
a host ID for identifying a host of the corresponding AVB stream;
a stream class for identifying priority assigned to the corresponding AVB stream; and
the stream subtype ID.

17. The apparatus according to claim 16, wherein the serial number is recorded in the AVB stream attribute table in ascending order of the records, and has a length of 4 bytes.

18. The apparatus according to claim 16, wherein the AVB stream ID is a unique ID obtained by combining the VLAN ID, the host ID, the stream class, the stream subtype ID and the serial number in described order.

19. The apparatus according to claim 16, wherein the AVB stream ID is an 8-byte unique ID obtained by combining:

the VLAN ID having a size of 1 byte;
the host ID having a size of 1 byte;
the stream class having a size of 1 byte;
the stream subtype ID having a size of 1 byte; and
the serial number having a size of 4 bytes.

20. The apparatus according to claim 16, wherein the VLAN ID is defined to identify a domain comprised in the in-vehicle Ethernet communication network.

21. The apparatus according to claim 16, wherein the VLAN ID is defined to identify a domain comprised in the in-vehicle Ethernet communication network and to identify at least one VLAN comprised in the identified domain.

22. The apparatus according to claim 13, wherein the domain comprises at least one of a body domain, a head unit domain, a powertrain domain, a multimedia domain and a chassis domain.

23. The apparatus according to claim 13, wherein the sub layer is a media access control (MAC) layer.

* * * * *